US012010604B2

(12) United States Patent
Paczkowski et al.

(10) Patent No.: US 12,010,604 B2
(45) Date of Patent: *Jun. 11, 2024

(54) WIRELESS COMMUNICATION SERVICE RESPONSIVE TO AN ARTIFICIAL INTELLIGENCE (AI) NETWORK

(71) Applicant: T-MOBILE INNOVATIONS LLC, Overland Park, KS (US)

(72) Inventors: Lyle Walter Paczkowski, Mission Hills, KS (US); Ada Nelly Pitocco, Saint Charles, IL (US); Zachary Kenneth McLain, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,224

(22) Filed: Aug. 24, 2022

(65) Prior Publication Data

US 2022/0408340 A1 Dec. 22, 2022

Related U.S. Application Data

(63) Continuation of application No. 17/193,489, filed on Mar. 5, 2021, now Pat. No. 11,477,719.

(51) Int. Cl.
H04L 12/24 (2006.01)
H04L 29/06 (2006.01)
H04L 67/10 (2022.01)
H04W 8/22 (2009.01)
H04W 28/02 (2009.01)
(Continued)

(52) U.S. Cl.
CPC .............. *H04W 40/18* (2013.01); *H04L 67/10* (2013.01); *H04W 8/22* (2013.01); *H04W 28/0268* (2013.01); *H04W 40/12* (2013.01); *H04W 40/20* (2013.01)

(58) Field of Classification Search
None
See application file for complete search history.

(56) References Cited

U.S. PATENT DOCUMENTS 10,338,913 B2 7/2019 Franchitti
10,382,918 B2 8/2019 Mattsson et al.
(Continued)

FOREIGN PATENT DOCUMENTS

WO WO-2022048744 A1 * 3/2022

*Primary Examiner* — Sithu Ko

(57) ABSTRACT

A wireless communication network serves User Equipment (UE) responsive to an Artificial Intelligence (AI) network. The UE determines Quality-of-Service (QoS) levels for a wireless data service at geographic locations. The UE transfers the QoS levels for the wireless data service at the geographic locations to a network core. The network core transfers the QoS levels for the wireless data service at the geographic locations for the UE to the AI network. The network core receives a future QoS level, future geographic location, and future time for the wireless data service for the UE from the AI network. The network core signals a network control-plane to deliver the wireless data service to the UE at the future geographic location and the future time using the future QoS level. The UE receives the wireless data service at the future geographic location and the future time using the future QoS level.

20 Claims, 10 Drawing Sheets

(51) Int. Cl.
*H04W 40/12* (2009.01)
*H04W 40/18* (2009.01)
*H04W 40/20* (2009.01)

(56) References Cited

U.S. PATENT DOCUMENTS

| | | |
|---|---|---|
| 10,492,023 B1 | 11/2019 | Gurin |
| 10,594,034 B1 | 3/2020 | Tran et al. |
| 10,674,421 B2 | 6/2020 | Jin et al. |
| 10,742,396 B2 | 8/2020 | Suthar et al. |
| 10,897,498 B1 | 1/2021 | Paczkowski et al. |
| 11,075,841 B2 | 7/2021 | Jin et al. |
| 11,178,156 B2 | 11/2021 | Pegg et al. |
| 11,284,240 B2* | 3/2022 | Kumar ............... H04W 8/22 |
| 11,516,090 B2* | 11/2022 | Örtenblad ............ H04W 8/18 |
| 2019/0232298 A1* | 8/2019 | Juhlin ............... B02C 2/045 |
| 2019/0306069 A1 | 10/2019 | Bacik et al. |
| 2019/0379530 A1 | 12/2019 | Suthar et al. |
| 2019/0379664 A1 | 12/2019 | Suthar et al. |
| 2020/0195495 A1 | 6/2020 | Parker et al. |
| 2020/0274765 A1 | 8/2020 | Dasgupta et al. |
| 2020/0351650 A1 | 11/2020 | Maria |
| 2021/0006972 A1 | 1/2021 | Guim Bernat et al. |
| 2021/0014132 A1 | 1/2021 | Smith et al. |
| 2021/0021494 A1* | 1/2021 | Yao ................. H04L 41/147 |
| 2021/0021619 A1 | 1/2021 | Smith et al. |
| 2021/0256010 A1 | 8/2021 | Sinclair et al. |
| 2021/0318859 A1 | 10/2021 | Narayanam et al. |
| 2021/0351993 A1* | 11/2021 | Puente Pestaña ..... H04L 41/046 |
| 2021/0352575 A1* | 11/2021 | Chun ................ H04W 72/02 |
| 2022/0150125 A1 | 5/2022 | Kumar et al. |
| 2022/0311656 A1* | 9/2022 | Vaishnavi ........... H04L 41/0813 |
| 2022/0330071 A1* | 10/2022 | Li .................. H04W 24/02 |
| 2022/0353732 A1* | 11/2022 | Filippou ............ H04W 28/0289 |
| 2023/0074288 A1* | 3/2023 | Filippou ............ H04W 28/0236 |

* cited by examiner

WIRELESS COMMUNICATION SERVICE RESPONSIVE TO AN ARTIFICIAL INTELLIGENCE (AI) NETWORK

RELATED CASES

This United States patent application is a continuation of U.S. patent application Ser. No. 17/193,489 that was filed on Mar. 5, 2021 and is entitled "WIRELESS COMMUNICATION SERVICE RESPONSIVE TO AN ARTIFICIAL INTELLIGENCE (AI) NETWORK." U.S. patent application Ser. No. 17/193,489 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a robot may execute a machine-control application that communicates with a robot controller over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), Interworking functions (IWFs), User Plane Functions (UPFs), Policy Control Functions (PCFs), Network Exposure Functions (NEFs), and the like.

A distributed ledger comprises multiple networked computer nodes that store data in a blockchain format. For the blockchain format, the distributed ledger executes a Distributed Application (dAPP) to execute ledger transactions that create data blocks. The distributed ledger redundantly stores the data blocks in the multiple ledger nodes. Each data block includes a hash of its previous data block to make the redundant data store immutable. The wireless communication networks use the distributed ledgers to store network usage data for the wireless user devices in an immutable format that is readable by the user.

Artificial Intelligence (AI) networks comprise edges and nodes. An AI node performs logical operations of various type and complexity. The AI edges transfer data between the AI nodes and indicate traffic levels between AI nodes. An AI network can receive data that characterizes user behavior, and over time, the AI network can effectively predict some future user behaviors. For example, an AI network can effectively predict future user locations and activities with some proficiency based on the past user locations and activities.

Unfortunately, the wireless communication networks do not effectively use the distributed ledgers to serve the wireless user devices in response to the AI networks. Moreover, the wireless communication networks do not efficiently use the distributed ledgers to transfer UE and network information to the AI networks.

TECHNICAL OVERVIEW

A wireless communication network serves User Equipment (UE) responsive to an Artificial Intelligence (AI) network. The UE determines Quality-of-Service (QoS) levels for a wireless data service at geographic locations. The UE transfers the QoS levels for the wireless data service at the geographic locations to a network core. The network core transfers the QoS levels for the wireless data service at the geographic locations for the UE to the AI network. The network core receives a future QoS level, future geographic location, and future time for the wireless data service for the UE from the AI network. The network core signals a network control-plane to deliver the wireless data service to the UE at the future geographic location and the future time using the future QoS level. The UE receives the wireless data service at the future geographic location and the future time using the future QoS level.

DETAILED DESCRIPTION

Figure 1:
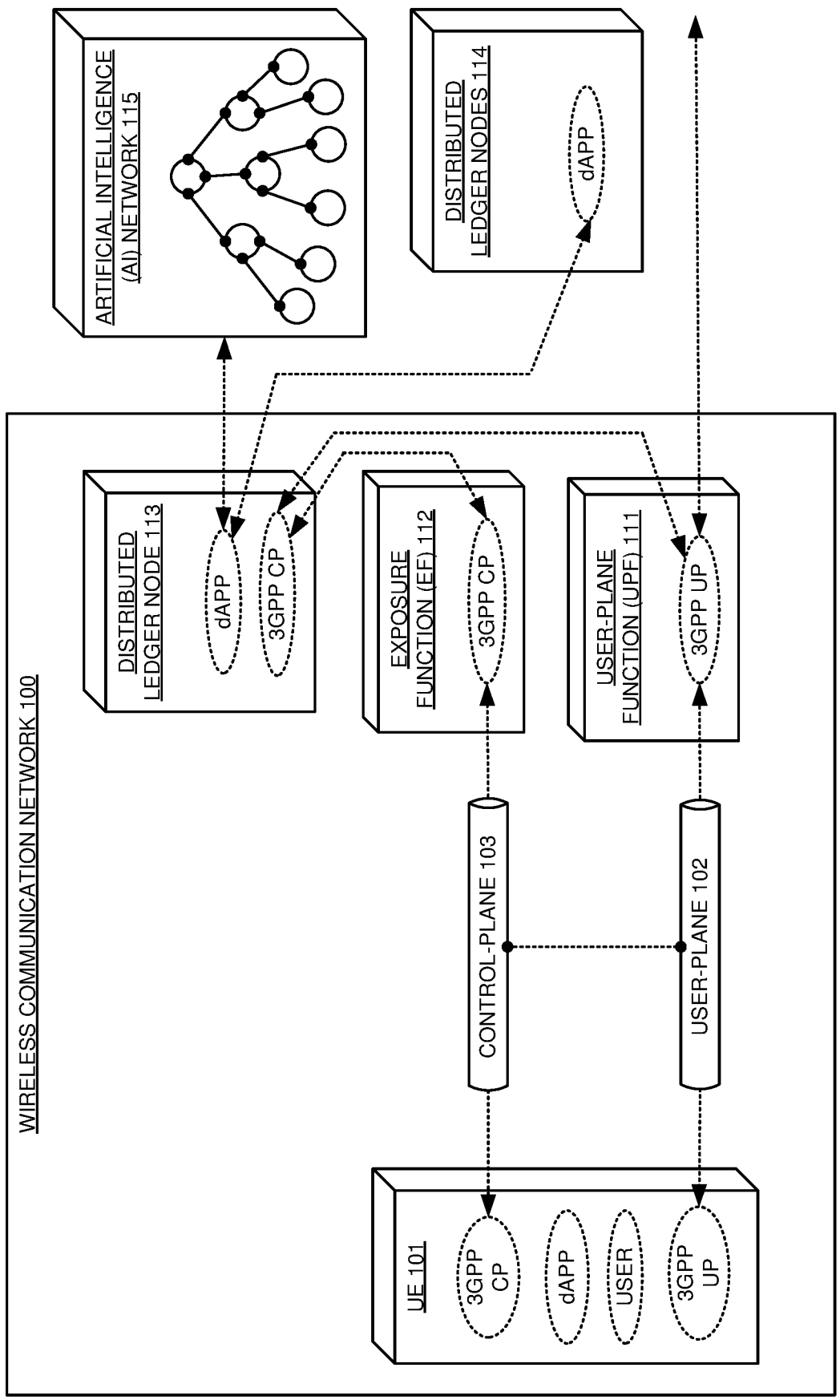
FIG. 1 illustrates a wireless communication network to serve User Equipment (UE) responsive to an Artificial Intelligence (AI) network.

FIG. 1 illustrates a wireless communication network 100 to serve User Equipment (UE) 101 responsive to Artificial Intelligence (AI) network 115. UE 101 comprises a computer, phone, vehicle, sensor, robot, or some other data appliance with wireless and/or wireline communication circuitry. Wireless communication network 100 delivers services to UE 101 like internet-access, machine-control, media-streaming, or some other data communications product. Wireless communication network 100 comprises UE 101, user-plane 102, control-plane 103, User Plane Function (UPF) 111, Exposure Function (EF) 112, and distributed ledger node 113. AI network 115 and distributed ledger nodes 114 are external to data communication network 100 in this example but could be integrated within network 100 in other examples. UE 101 comprises user applications (USER), Third Generation Partnership Project Control- Plane Applications (3GPP CP), 3GPP User Plane Applications (3GPP UP), and a Distributed Application (dAPP). UPF 111 comprises a 3GPP UP. EF 112 comprises a 3GPP CP. Distributed ledger nodes 430-431 comprise the dAPP, and distributed ledger node 113 also comprises a 3GPP CP.

Various examples of network operation and configuration are described herein. In some examples, UE 101 and distributed ledger nodes 113-114 execute the dAPP. UE 101 receives a wireless data service from wireless communication network 100. UE 101 responsively transfers UE status data that indicates user applications and current status to distributed ledger node 113 over wireless communication network 100. Distributed ledger node 113 also receives past QoS levels and past geographic locations for the wireless data service and UE 101 from EF 112 and/or UE 101. The QoS levels indicate bit rate, latency, error rate, and/or some other performance metrics. The geographic locations may be precise or abstract based on user application and control. Distributed ledger node 113 stores the UE status data that indicates user applications and current status, the past QoS levels, and the past geographic locations in a blockchain format that is readable by AI network 115. In some examples, AI network 115 hosts and reads one of distributed ledger nodes 114. AI network 115 processes the UE status data, the past QoS levels, the past geographic locations, and typically other data like user-plane status, and in response, AI network 115 determines a future QoS level, future geographic location, and the future time for UE 101. AI network 115 transfers the future QoS level, future geographic location, and the future time for UE 101 to distributed ledger node 113. Distributed ledger node 113 transfers the future QoS level, future geographic location, and the future time for UE 101 to EF 112. In some examples, an Application Function (AF) hosts and reads distributed ledger node 113, and the AF transfers the future QoS level, location, and time for UE 101 to EF 112. EF 112 signals control-plane 103 to deliver the wireless data service to UE 101 at the future geographic location and the future time using the future QoS level. Control-plane 103 signals UE 101, user-plane 102, and UPF 111 to deliver the wireless data service to UE 101 at the future geographic location and the future time using the future QoS level. UE 101, user-plane 102, and UPF 111 transfer user data to deliver the wireless data service at the future geographic location and the future time using the future QoS level.

Advantageously, wireless communication network 100 uses distributed ledger node 113 to effectively serve UE 101 in response to AI network 115. Moreover, wireless communication network 100 uses distributed ledger node 113 to efficiently transfer UE and network information to AI network 115.

In some examples, wireless communication network 100 has a wireless network slice that comprises UE 101, UPF 111, and distributed ledger node 113. The wireless network slice features a default bearer from UE 101 to distributed ledger node 113 over user plane 102 and UPF 111. UE 101 may transfer its UE status data to distributed ledger node 113 over the default bearer. UE 101 may establish an N1 signaling link over control-plane 103 and transfer UE status data to distributed ledger node 113 over the N1 signaling link and EF 112. In some examples, UE 101 stores a hardware identifier in a read-only memory and establishes hardware trust with distributed ledger node 113 based on the hardware identifier.

UE 101 communicates with network user plane 102 and control plane 103 over technologies like Fifth Generation New Radio (5GNR), Long Term Evolution (LTE), Low-Power Wide Area Network (LP-WAN), Institute of Electrical and Electronic Engineers (IEEE) 802.11 (WIFI), IEEE 802.3 (ENET), Bluetooth, Narrowband Internet-of-Things (NB-IoT), Internet Protocol (IP), and/or some other data networking protocol. The wireless communication technologies use electromagnetic frequencies in the low-band, mid-band, high-band, or some other portion of the electromagnetic spectrum. The communication links that support these technologies use metallic links, glass fibers, radio channels, or some other communication media. The communication links use ENET, Time Division Multiplex (TDM), Data Over Cable System Interface Specification (DOCSIS), IP, General Packet Radio Service Transfer Protocol (GTP), 3GPP, 5GNR, LTE, WIFI, IP, virtual switching, inter-processor communication, bus interfaces, and/or some other data communication protocols.

UE 101, user-plane 102, and control-plane 103 comprise antennas, amplifiers, filters, modulation, analog/digital interfaces, microprocessors, software, memories, transceivers, bus circuitry, and the like. UPF 111, EF 112, and distributed ledger node 113 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of data communication network 100 as described herein.

User-plane 102 may comprise: 5GNR gNodeBs, LTE eNodeBs, non-3GPP Access Nodes (ANs), non-3GPP Interworking Functions (IWFs), UPFs, and/or some other network elements that handle user data. Control-plane 103 may comprise: gNodeBs, eNodeBs, IWFs, Access and Mobility Management Functions (AMFs), Session Management Functions (SMFs), Policy Control Functions, (PCFs), Uniform Data Repositories (UDRs) and/or some other network elements that control user plane 102 and UPF 111 with network signaling. EF 112 could be integrated into control plane 103. UPF 111 could be integrated into user-plane 102.

Figure 2:
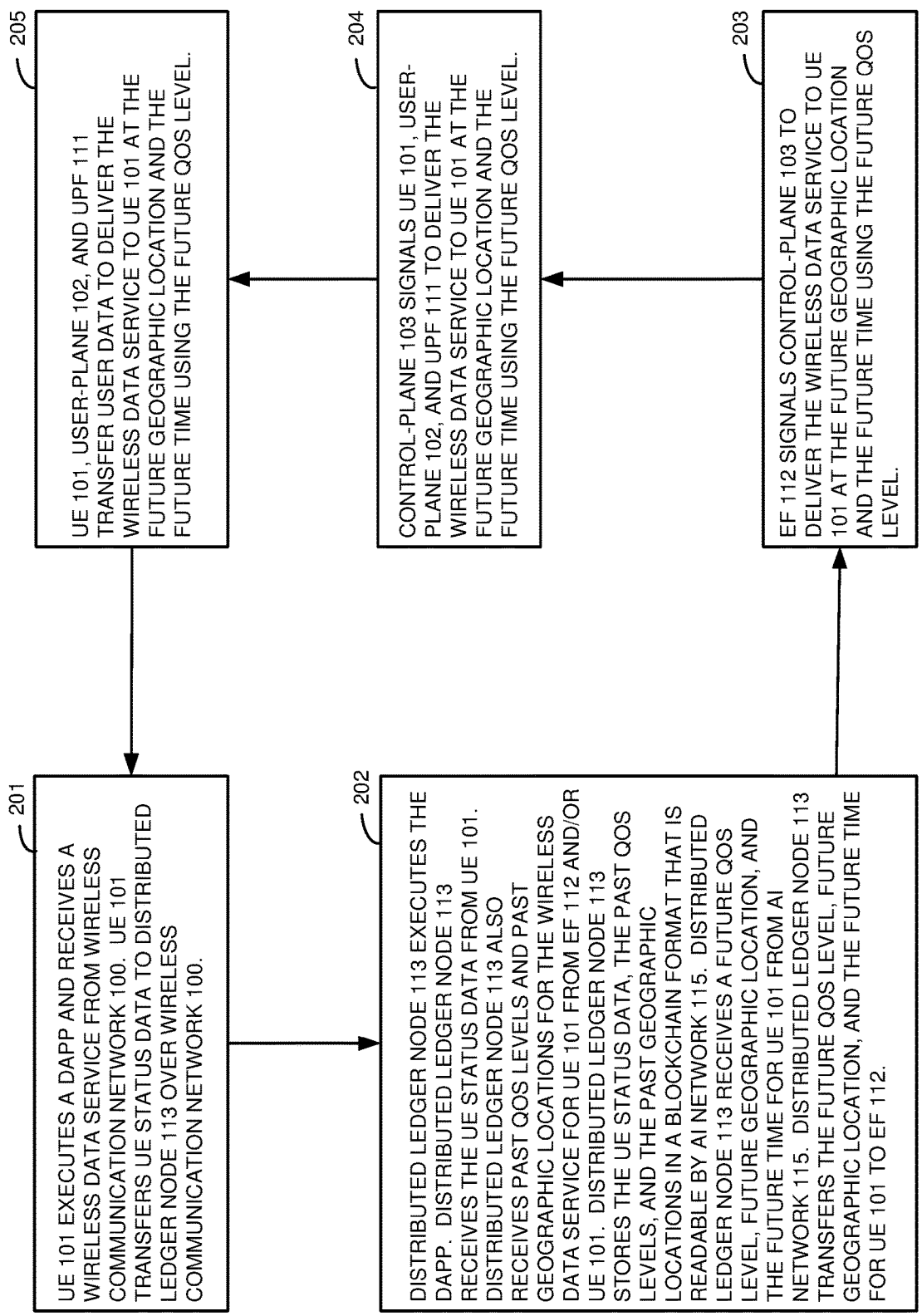
FIG. 2 illustrates an exemplary operation of the wireless communication network to serve the UE responsive to the AI network.

FIG. 2 illustrates an exemplary operation of wireless communication network 100 to serve UE 101 responsive to AI network 115. The operation may vary in other examples. UE 101 executes a dAPP and receives a wireless data service from wireless communication network 100 (201). UE 101 transfers UE status data that indicates user applications and current status to distributed ledger node 113 over wireless communication network 100 (201). Distributed ledger node 113 executes the dAPP (202). Distributed ledger node 113 receives the UE status data from UE 101 (202). Distributed ledger node 113 also receives past QoS levels and past geographic locations for the wireless data service for UE 101 from EF 112 and/or UE 101 (202). Distributed ledger node 113 stores the UE status data that indicates user applications and current status, the past QoS levels, and the past geographic locations in a blockchain format that is readable by AI network 115 (202). Distributed ledger node 113 receives a future QoS level, future geographic location, and the future time for UE 101 from AI network 115 (202). Distributed ledger node 113 transfers the future QoS level, future geographic location, and the future time for UE 101 to EF 112 (202). EF 112 signals control-plane 103 to deliver the wireless data service to UE 101 at the future geographic location and the future time using the future QoS level (203).

Control-plane 103 signals UE 101, user-plane 102, and UPF 111 to deliver the wireless data service to UE 101 at the future geographic location and the future time using the future QoS level (204). UE 101, user-plane 102, and UPF 111 transfer user data to deliver the wireless data service to UE 101 at the future geographic location and the future time using the future QoS level (205).

Figure 3:
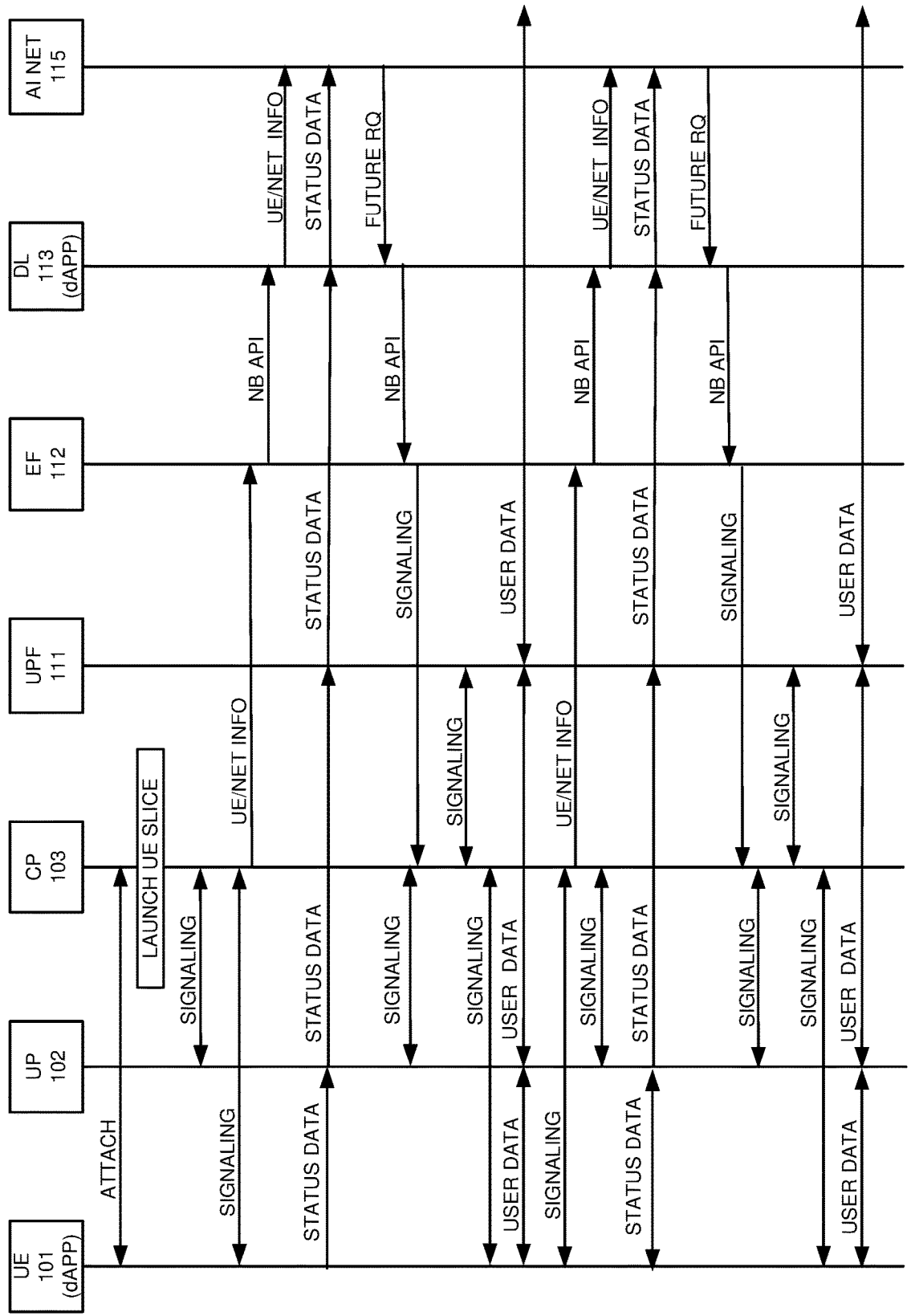
FIG. 3 illustrates an exemplary operation of the wireless communication network to serve the UE responsive to the AI network.

FIG. 3 illustrates an exemplary operation of wireless communication network 100 to serve UE 101 responsive to AI network 115. The operation may vary in other examples. UE 101 executes the dAPP. UE 101 wirelessly attaches to control-plane 103 and establishes an N1 signaling link. In response to the attachment, control-plane 103 launches a UE slice for UE 101 that comprises UE 101, UPF 111, and distributed ledger node (DL) 113. Control-plane 103 and user-plane 102 exchange signaling to drive the wireless communication service for UE 101 over the UE slice. Control-plane 103 and UE 101 exchange signaling to drive the wireless communication service over the UE slice. Control-plane 103 transfers information for UE 101 and wireless communication network 100 to EF 112. The information for UE 101 and network 100 indicates past QoS levels and past geographic locations for the wireless data service for UE 101—along with other information like network status. EF 112 transfers the information for UE 101 and network 100 to distributed ledger node 113 over a 3GPP Northbound Application Programming Interface (NB API) between EF 112 and distributed ledger node 113.

The UE slice includes a default bearer from UE 101 to distributed ledger node 113 over user plane 102 and UPF 111. UE 101 transfers UE status data that indicates user applications and current status to distributed ledger node 113 over the default bearer which traverses user-plane 102 and UPF 111. The user applications could be for media-conferencing, machine-control, or some other user product. The status could be downloaded, disabled, off, dormant, executing, or some other application state. UE 101 may also transfer UE status data to distributed ledger node 113 over the N1 signaling link to control-plane 103, EF 112, and the 3GPP NB API to distributed ledger node 113. Distributed ledger node 113 stores the UE status data, the past QoS levels, and the past geographic locations in the blockchain format that is readable by AI network 115. In some examples, AI network 115 hosts one of distributed ledger nodes 114.

AI network 115 processes the UE status data, the past QoS levels, the past geographic locations, and typically other data like network status, and in response, transfers a future communication request (RQ) for UE 101 that comprises a future QoS level, future geographic location, and the future time to distributed ledger 113. Distributed ledger 113 transfers the future QoS level, future geographic location, and the future time for UE 101 to EF 112 over the NB API. In some examples, an AF reads the future QoS level, location, and time from distributed ledger 113 and transfers the future QoS level, location, and time to EF 112 over the NB API. EF 112 signals control-plane 103 to deliver the wireless data service to UE 101 at the future geographic location and the future time using the future QoS level. Control-plane 103 signals UE 101, user-plane 102, and UPF 111 to deliver of the wireless data service to UE 101 at the future geographic location and the future time using the future QoS level. UE 101, user-plane 102, and UPF 111 transfer user data to deliver the wireless data service to UE 101 at the future geographic location and the future time using the future QoS level.

Control-plane 103 and UE 101 exchange more signaling to drive the wireless communication service over the UE slice. Control-plane 103 transfers more information for UE 101 and network 100 to EF 112. The additional information for UE 101 and network 100 indicates the recent QoS levels and recent geographic locations for the wireless data service for UE 101 delivered in the previous paragraph—along with other new information like network status. EF 112 transfers the additional information for UE 101 and network 100 to distributed ledger node 113 over the NB API. Control-plane 103 and user-plane 102 exchange more signaling to drive the wireless communication service for UE 101 over the UE slice.

UE 101 transfers more UE status data to distributed ledger node 113 over the default bearer which traverses user-plane 102 and UPF 111. Distributed ledger node 113 stores the UE status data, the past QoS levels, and the past geographic locations in the blockchain format that is readable by AI network 115. AI network 115 processes the UE status data, the past QoS levels, the past geographic locations, and typically other data like network status, and in response, transfers a future communication request for UE 101 that comprises another future QoS level, another future geographic location, and another future time to distributed ledger 113. Distributed ledger 113 transfers the other future QoS level, other future geographic location, and other future time for UE 101 to EF 112 over the NB API. EF 112 signals control-plane 103 to deliver the wireless data service to UE 101 at the other future geographic location and other future time using the other future QoS level. Control-plane 103 signals UE 101, user-plane 102, and UPF 111 to deliver the wireless data service to UE 101 at the other future geographic location and the other future time using the other future QoS level. UE 101, user-plane 102, and UPF 111 transfer user data to deliver the wireless data service to UE 101 at the other future geographic location and the other future time using the other future QoS level.

Figure 4:
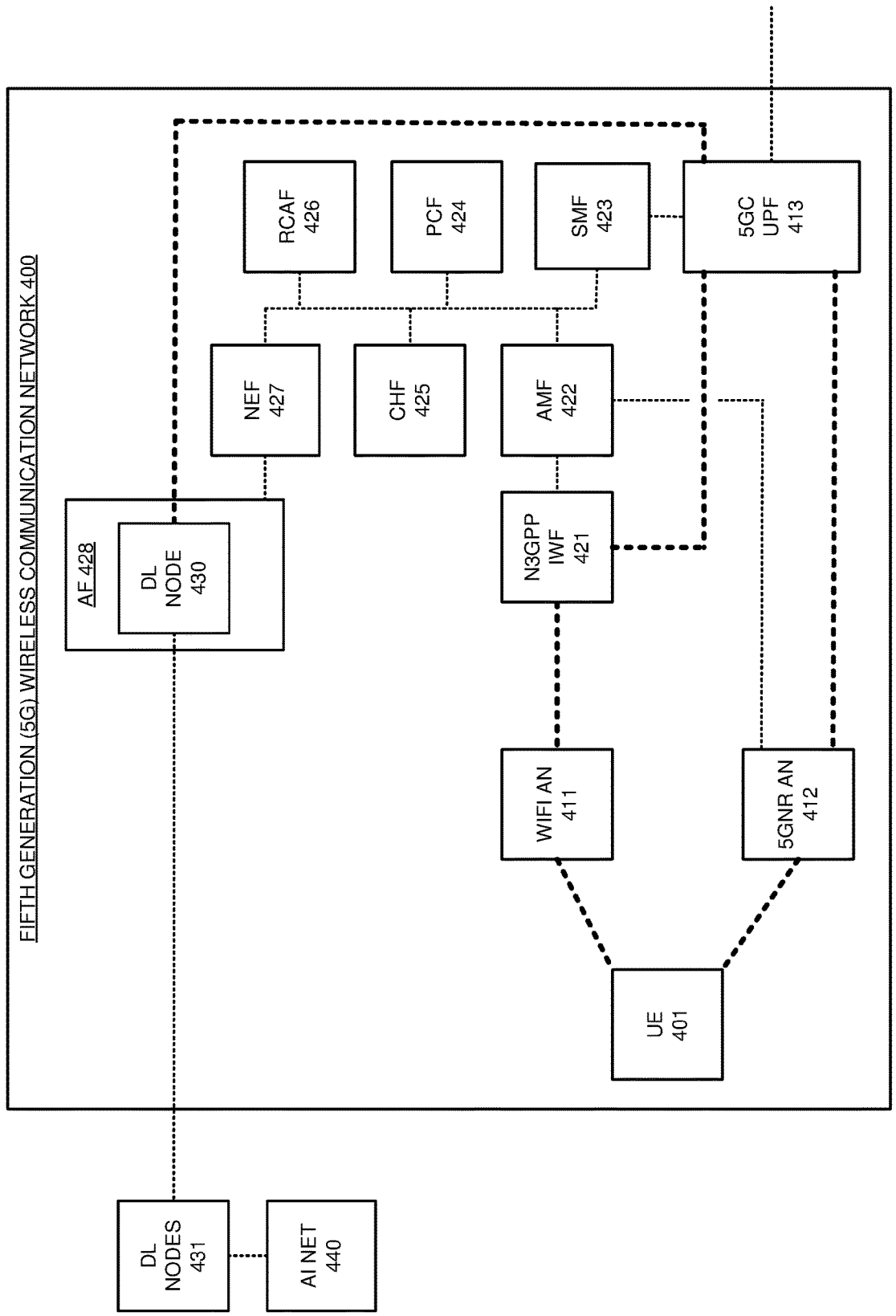
FIG. 4 illustrates a Fifth Generation (5G) wireless communication network to serve a UE responsive to an AI network.

FIG. 4 illustrates Fifth Generation (5G) wireless communication network 400 to serve UE 401 responsive to AI network 440. 5G wireless communication network 400 comprises an example of wireless communication network 100, although network 100 may vary from this example. 5G wireless communication network 400 comprises UE 401, WIFI Access Node (AN) 411, Fifth Generation New Radio (5GNR) AN 412, Fifth Generation Core (5GC) User Plane Function (UPF) 413, 5GC non-3GPP Interworking Function (N3IWF) 421, 5GC Access and Mobility Management Function (AMF) 422, 5GC Session Management Function (SMF) 423, Policy Control Function (PCF) 424, Charging Function (CHF) 425, Radio Access Network Congestion Awareness Function (RCAF) 426, Network Exposure Function (NEF) 427, and Application Function 428. In this example, AF 428 comprises DL node 430, but DL node is external to AF 428 in other examples.

AMF 422 and NEF 427 exchange UE data for UE 101 like location information. SMF 423 and NEF 427 exchange session data for UE 401 like Quality-of-Service (QoS) and data amount. PCF 424 and NEF 427 exchange policy data for UE 401 like roaming or application restrictions. CHF 424 and NEF 427 exchange charging data for UE 401 like charging allocations to various entities by time, application, and the like. RCAF 426 and NEF 427 exchange RAN data for UE 401 like congestion alerts. NEF 427 and AF 428 exchange the UE data, session data policy data, charging data, and RAN data over the NB API. AF 428 and DL node 430 exchange the UE data, session data policy data, charging data, and RAN data.

DL nodes 430-431 execute a Distributed Application (dAPP), and in response, store some of the UE data, session data, policy data, charging data, and RAN data in a blockchain format. AI network 440 reads the stored data from ledger nodes 431 and generates network instructions to control UE 101 and its sessions, policies, charges, and RANs. AI network 440 may host one of DL nodes 431. AI network 440 transfers the network instructions for UE 101 to DL nodes 430-431. DL nodes 430-431 execute the dAPP and responsively store the network instructions in the blockchain format. DL node 430 transfers the network instructions for UE 101 to AF 428. AF 428 may read the network instructions from the ledger and transfer the network instructions to NEF 427 over the NB API. NEF 427 transfers the network UE instructions to AMF 422 in the UE data. NEF 427 transfers the network session instructions to SMF 423 in the session data. NEF 427 transfers the network policy instructions to PCF 424 in the policy data. NEF 427 transfers the network charging instructions to CHF 425 in the charging data.

UE 401 attaches to WIFI AN 411 and/or 5GNR AN 412. UE registers with AMF 422 over WIFI AN 411 and N3IWF 421 and/or over 5GNR AN 412. UE 401 and AMF 422 establish an N1 over WIFI AN 411 and N3IWF 421 and/or over 5GNR AN 412. UE 401 reports an "intelligent slice" capability, and AMF selects a wireless network slice for UE 401 that responds to AI network 440 based on the UE ID and the intelligent slice request. The intelligent slice comprises UE 401, UPF 413, SMF 423, PCF 424, CHF 425, AF 428, and DL node 430. The intelligent slice includes a default bearer from UE 401 to DL node 430 over WIFI AN 411, N3IWF 421, and UPF 413 and/or over 5GNR AN 412 and UPF 413. In response to the selected slice, AMF 422 signals SMF 423 to serve the default bearer to UE 401. AMF 422 also signals N3IWF 421 and/or 5GNR AN 412 to serve the default bearer to UE 401. SMF 423 drives UPF 413 to serve the default bearer to UE 401 between DL node 430 and N3IWF 421 and/or 5GNR AN 412.

UE 401 and DL node 430 exchange UE data over the default bearer. The UE data indicates the user applications is UE 401 and their current status like downloaded, disabled, off, dormant, executing, or some other application state. In some examples, UE 401 also exchanges UE data with DL node 430 over the N1, AMF 22, NEF 427, NB API, and AF 428. DL nodes 430-431 execute the dAPP, and in response, store some of this UE data in the blockchain format. AI network 440 reads the stored UE data from the ledger and generates network instructions to control UE 401 and its sessions, policies, charges, and RANs. The network instructions are to establish a service bearer for UE 401 to an external system at a future QoS, time, and location. AI network 440 transfers the network instructions for UE 401 to DL nodes 430-431. DL nodes 430-431 execute the dAPP and responsively store the network instructions in the blockchain format. DL node 430 transfers the network instructions for UE 401 to AF 428 which transfers the network instructions to NEF 427 over the NB API. NEF 427 transfers the network UE instructions to AMF 422 in the UE data. NEF 427 transfers the network session instructions to SMF 423 in the session data. NEF 427 transfers the network policy instructions to PCF 424 in the policy data. NEF 427 transfers the network charging instructions to CHF 425 in the charging data.

In response to network instructions to establish the service bearer for UE 101 to the external system at the future QoS, time, and location, PCF 424 transfers network policy instructions to AMF 422, SMF 423, and other policy enforcement points. In response to network instructions, CHF 425 transfers network charging instructions to SMF 423 and other charging enforcement points. AMF 422 signals SMF 423 to serve the service bearer to UE 401 at the QoS. AMF 431 signals N3IWF 421 and/or 5GNR AN 412 to serve the service bearer to UE 401 at the QoS. SMF drives UPF 413 to serve the service bearer to UE 401 at the QoS between N3IWF 421 and/or 5GNR AN 412 an external system. AMF 422, SMF 423, and possibly AN 512 signal UE 401 to use the service bearer to the external system. UE 401 and the external system exchange user data over AN 411, N3IWF 421, and UPF 413 and/or over 5GNR AN 412 and UPF 413. N3IWF 421, 5GNR AN 412, and UPF 413 deliver the service bearer using the specified QoS at the specific time and the specific location.

AI network 440 monitors UE 401 and 5G network 400 to select a date, time, location, QoS, charge, endpoints, and the like for future sessions. For example, AI network 440 might automatically direct traffic alerts to UE 401 during a key decision point in a daily commute. AI network 440 might automatically direct a burst of health data from UE 401 to a medical system based on past user activity—including user health metrics in the UE data. AI network 440 may also respond to live UE requests. For example, AI network 440 may automatically direct a video to UE 401 based on a user video request in the UE data.

AI network 440 may control handovers for UE 401 as it moves about. If a handover of UE 401 will require a mobility anchor change and new IP address in a break before make scenario, AI network 440 can predict the handover scenario and prime UE 401 and network 400 to minimize the delay caused by the IP address allocation and UPF anchor switch. AI network 440 may direct network 400 to accelerate the IP address allocation and the UPF anchor addition to create a soft handover and make before break scenario. AI network 440 may also direct network 400 to handover UE 401 to optimal access nodes and avoid poor network performance.

Figure 5:
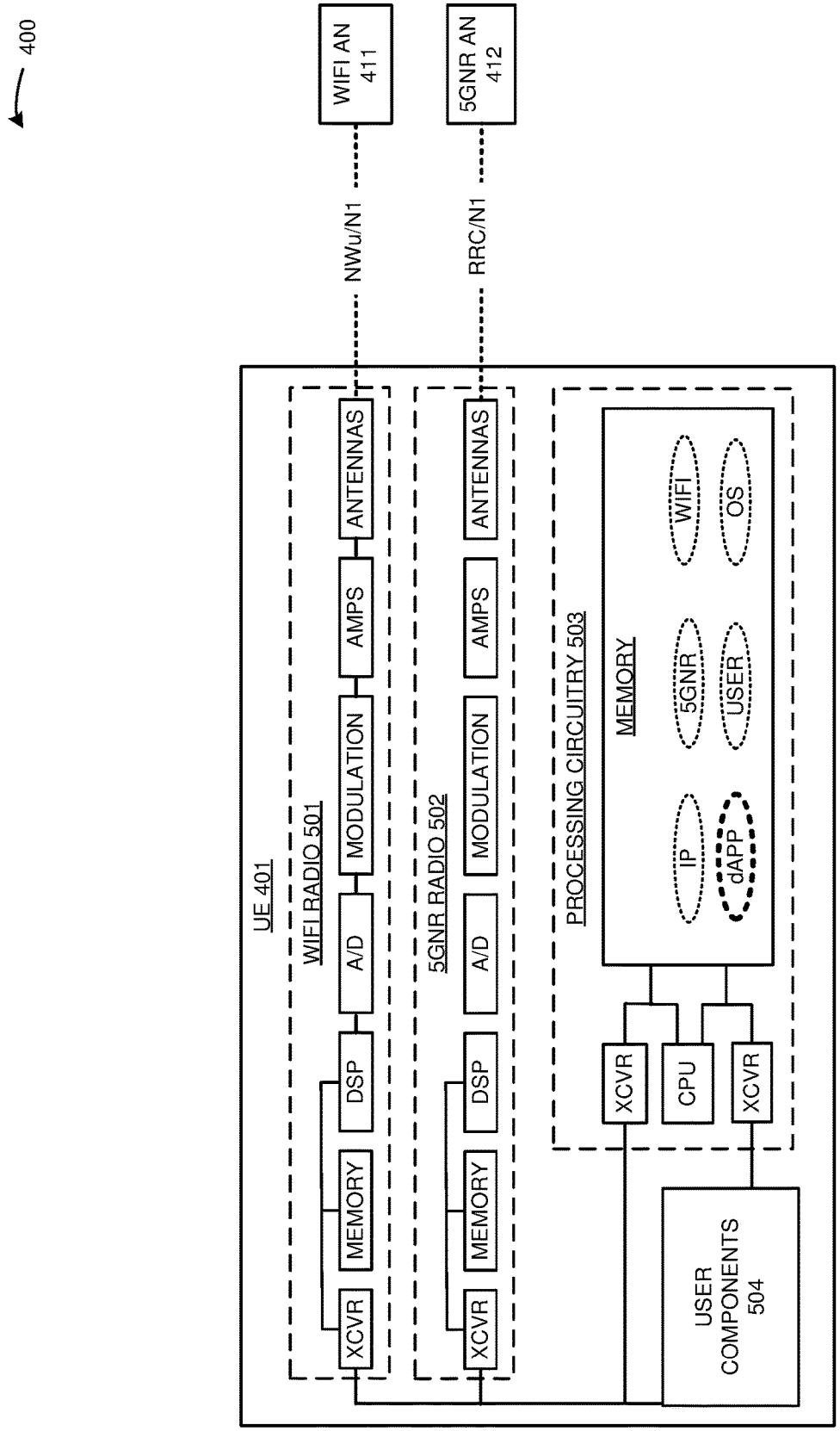
FIG. 5 illustrates the UE in the 5G wireless communication network.

FIG. 5 illustrates UE 401 in 5G wireless communication network 400. UE 401 comprises an example of UE 101, although UE 101 may differ. UE 401 comprises WIFI radio 501, 5GNR radio 502, processing circuitry 503, and user components 504. Radios 501-502 comprise antennas, amplifiers, filters, modulation, analog-to-digital interfaces, DSP, memory, and transceivers that are coupled over bus circuitry. Processing circuitry 503 comprises memory, CPU, user interfaces and components, and transceivers that are coupled over bus circuitry. The memory in processing circuitry 503 stores an operating system, user applications (USER), and network applications for IP, 5GNR, WIFI, and the dAPP. The network applications include physical layer, media access control, link control, convergence and adaption, radio resource control, and the like.

The antennas in WIFI radio 501 are wirelessly coupled to WIFI AN 411 over a WIFI link that supports NWu and N1. The antennas in 5GNR radio 502 are wirelessly coupled to 5GNR AN 412 over a 5GNR link that supports RRC and N1. Transceivers in radios 501-502 are coupled to transceivers in processing circuitry 503. Transceivers in processing circuitry 503 are coupled to user components 504 like displays, controllers, and memory. The CPU in processing circuitry 503 executes the operating system, user applications, and network applications to exchange network signaling and user data with ANs 411-412 over respective radios 501-502.

The network applications in UE 401 attach to WIFI AN 411 and/or 5GNR AN 412. The 5GNR network applications in UE 401 registers with AMF 422 over WIFI AN 411 and N3IWF 421 and/or over 5GNR AN 412. The 5GNR network applications in UE 401 and AMF 422 establish an N1 over WIFI AN 411 and N3IWF 421 and/or over 5GNR AN 412. The 5GNR network applications in UE 401 report the intelligent slice capability. The 5GNR network applications in UE 401 receive network signaling from AMF 422, SMF 423, and possibly AN 512 to exchange UE data with DL node 430 over the default bearer. UE 401 and DL node 430 exchange UE data over AN 411, N3IWF 421, and UPF 413 and/or over 5GNR AN 412 and UPF 413. The UE data identifies the user applications in processing circuitry 503 and their current status—downloaded, disabled, off, dormant, executing, or some other application state. The 5GNR network applications in UE 401 may also exchange UE data with DL node 430 over the N1, AMF 22, NEF 427, NB API, and AF 428. The dAPP in UE 401 may use the default bearer to communicate with the dAPP in DL node 430. For example, the dAPP may request a video download based on a user request. The 5GNR network applications receive signaling from AMF 422, SMF 423, and possibly AN 512 to use the service bearer to the external system. UE 401 and the external system exchange user data over AN 411, N3IWF 421, and UPF 413 and/or over 5GNR AN 412 and UPF 413. The dAPP may use the service bearer.

Figure 6:
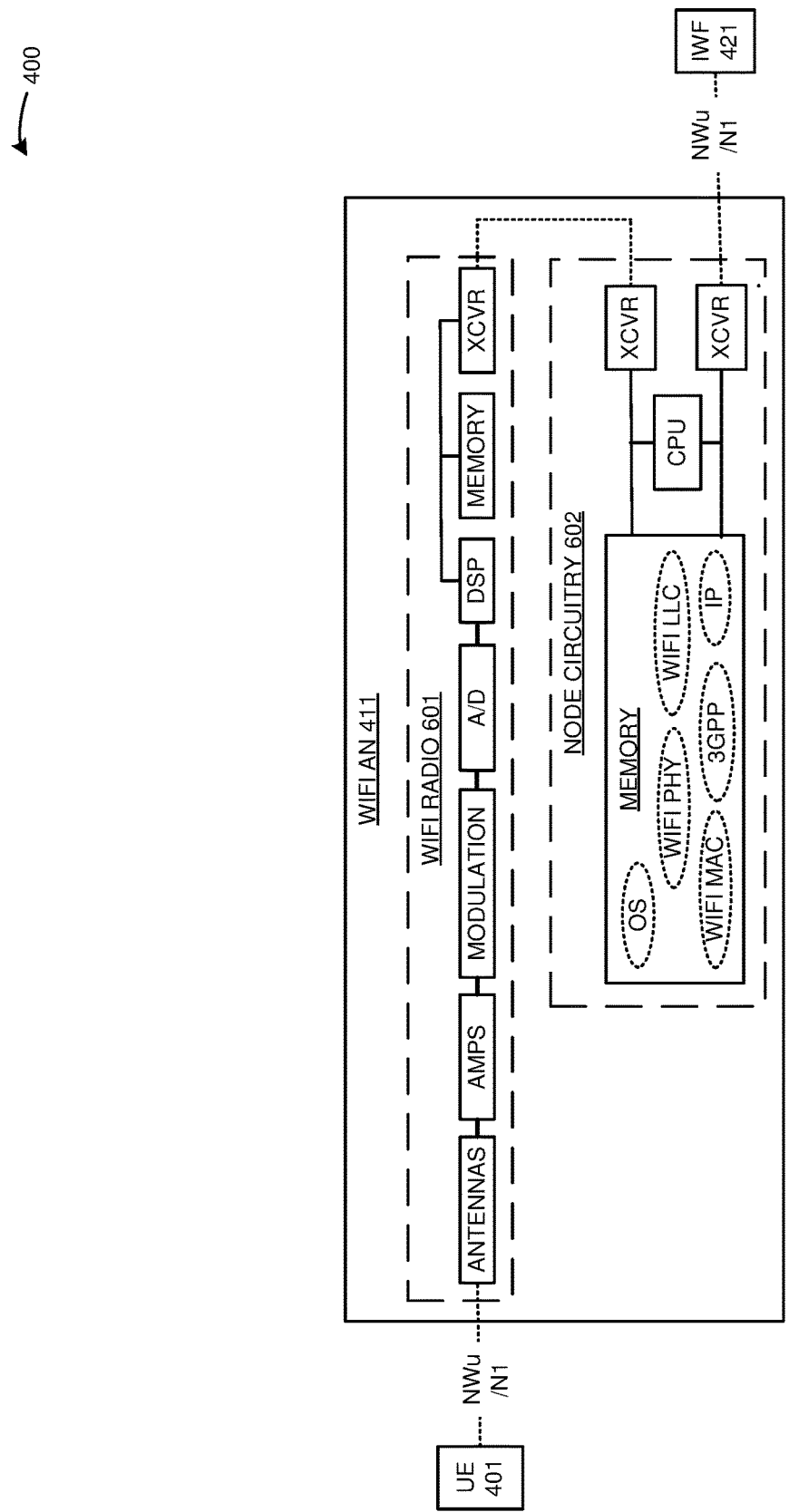
FIG. 6 illustrates an IEEE 802.11 (WIFI) WIFI access node in the 5G wireless communication network.

FIG. 6 illustrates IEEE 802.11 (WIFI) access node 411 in 5G wireless communication network 400. WIFI AN 421 comprise an example of user-plane 102 and control-plane 103, although planes 102-103 may differ. WIFI AN 422 comprises WIFI radio 601 and node circuitry 602. Radio 601 comprises antennas, amplifiers, filters, modulation, analog-to-digital interfaces, DSP, memory, and transceivers that are coupled over bus circuitry. Node circuitry 602 comprises memory, CPU, and transceivers that are coupled over bus circuitry. The memory in node circuitry 602 stores operating systems and network applications like WIFI PHY, WIFI MAC, WIFI LLC, IP, and 3GPP. The antennas in WIFI radio 601 are wirelessly coupled to UE 401 over wireless links that support NWu and N1. Transceivers in WIFI radio 601 are coupled to transceivers in node circuitry 602, and transceivers in node circuitry 602 are coupled to transceivers in N3IWF 421 over links that support NWu and N1. The CPU in node circuitry 602 executes the operating system and network applications to exchange data and signaling with UE 401 and to exchange data and signaling with N3IWF 421.

Figure 7:
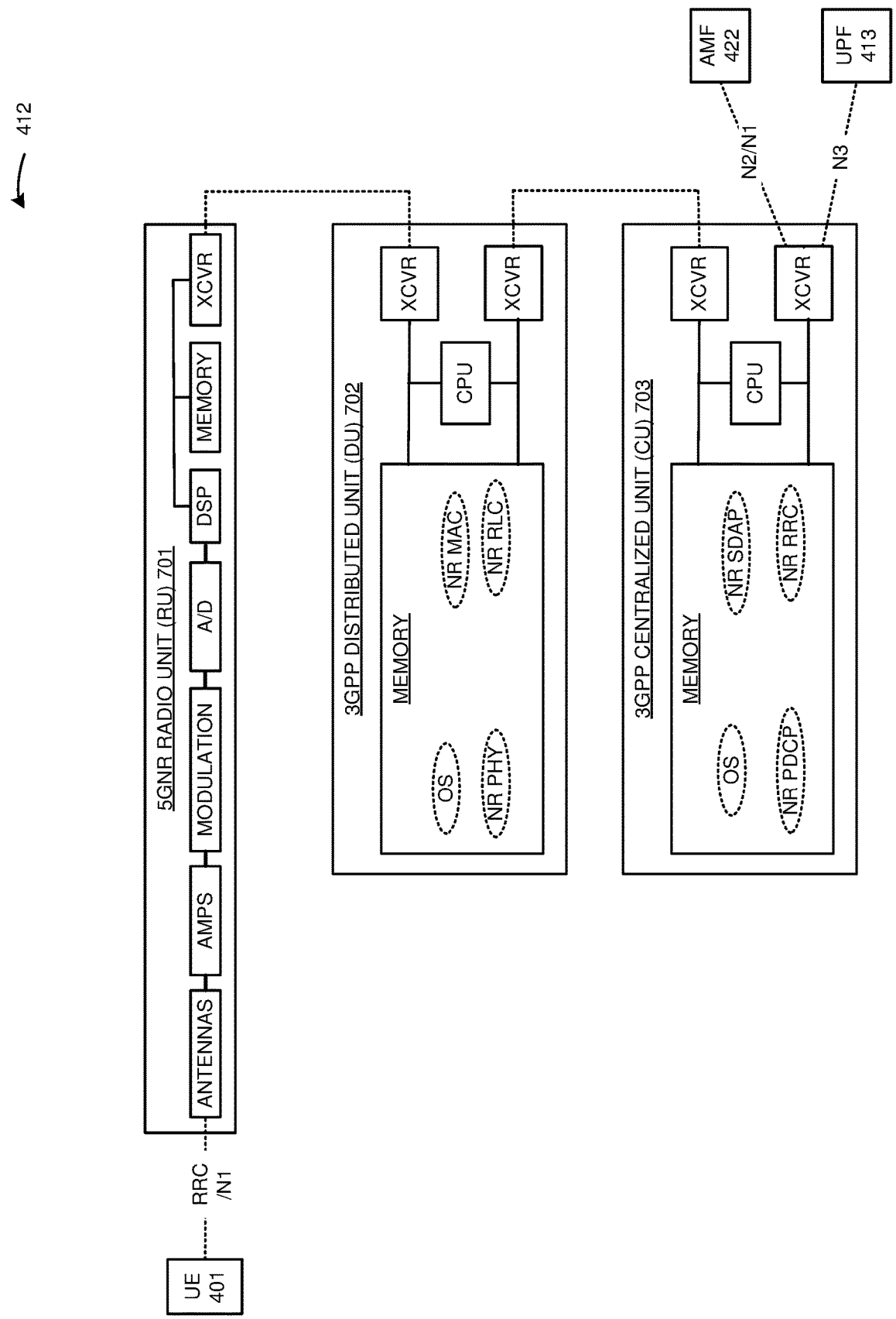
FIG. 7 illustrates Fifth Generation New Radio (5GNR) access node in the 5G wireless communication network.

FIG. 7 illustrates Fifth Generation New Radio (5GNR) access node 412 in 5G wireless communication network 400. 5GNR access node 412 comprises an example of user-plane 102 and control plane 103, although planes 102-103 may differ. 5GNR access node 412 comprises 5GNR Radio Unit (RU) 701, 3GPP Distributed Unit (DU) 702, and 3GPP Centralized Unit (CU) 703. RU 701 comprises antennas, amplifiers, filters, modulation, analog-to-digital interfaces, DSP, memory, and transceivers that are coupled over bus circuitry. DU 702 comprises memory, CPU, and transceivers that are coupled over bus circuitry. The memory in DU 702 stores operating systems and network applications like PHY, MAC, LLC, and RLC. CU 703 comprises memory, CPU, and transceivers that are coupled over bus circuitry. The memory in CU 703 stores an operating system and network applications like Packet Data Convergence Protocol (PDCP), Service Data Adaptation Protocol (SDAP), Radio Resource Control (RRC), and IP.

The antennas in 5GNR RU 701 are wirelessly coupled to UE 401 over 5GNR links that support RRC and N1. Transceivers in RU 701 are coupled to transceivers in DU 702 over fronthaul links like enhanced Common Public Radio Interface (eCPRI). Transceivers in DU 702 coupled to transceivers in CU 703 over mid-haul links. Transceivers in CU 703 are coupled to AMF 422 and UPF 413 over backhaul links. The CPU in DU 703 executes an operating system and network applications to exchange 5GNR data units with RU 701 and to exchange 5GNR data units with CU 703. The CPU in CU 703 executes an operating system and network applications to exchange the 5GNR data units with DU 702, exchange N2/N1 signaling with AMF 422, and exchange N3 data with UPF 413.

Figure 8:
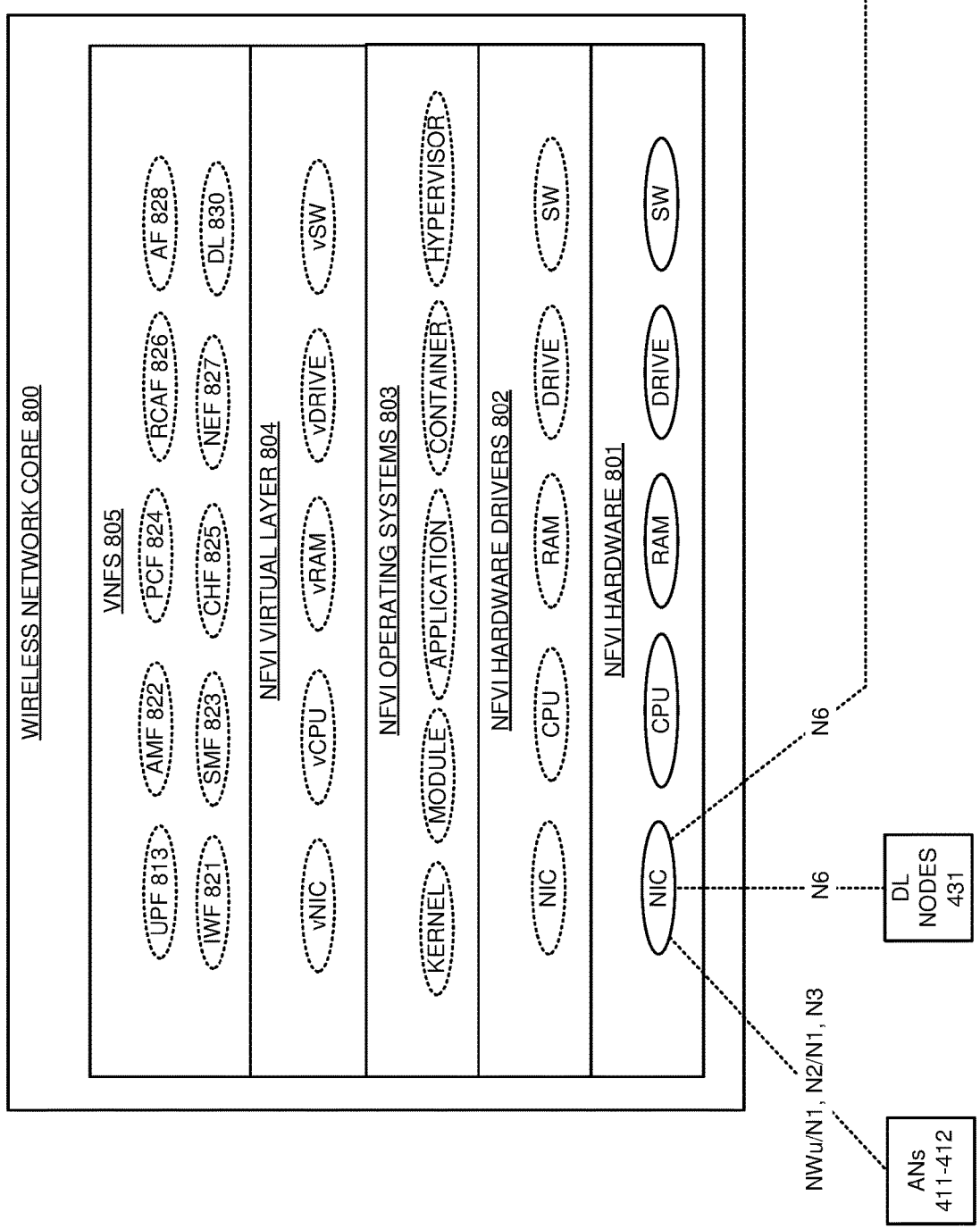
FIG. 8 illustrates a wireless network core in the wireless communication network.

FIG. 8 illustrates wireless network core 800 in 5G wireless communication network 400. Network core 800 comprises an example of user-plane 102, control-plane 103, UPF 111, EF 112, and DL node 113, although user-plane 102, control-plane 103, UPF 111, EF 112, and DL node 113 may differ. Network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise UPF 813, IWF 821, AMF 822, SMF 823, PCF 824, CHF 825, RCAF 826, NEF 827, AF 828, and DL 830. and Other VNFs like Authentication Server Function (AUSF) and Network Repository Function (NRF) are typically present but are omitted for clarity. Network core 800 may be located at a single site or be distributed across multiple geographic locations. The NIC in NFVI hardware 801 are coupled to ANs 412-413 over data links that support NWu, N1, N2, N3, and N6. NFVI hardware 801 executes NFVI hardware drivers 802, NFVI operating systems 803, NFVI virtual layer 804, and NFVI VNFs 805 to form and operate UPF 413, N3IWF 421, AMF 422, SMF 423, PCF 424, CHF 425, RCAF 426, NEF 427, AF 428, and DL node 430. In some examples, DL VNF 830 is omitted and DL node 430 is external to wireless network core 800.

Figure 9:
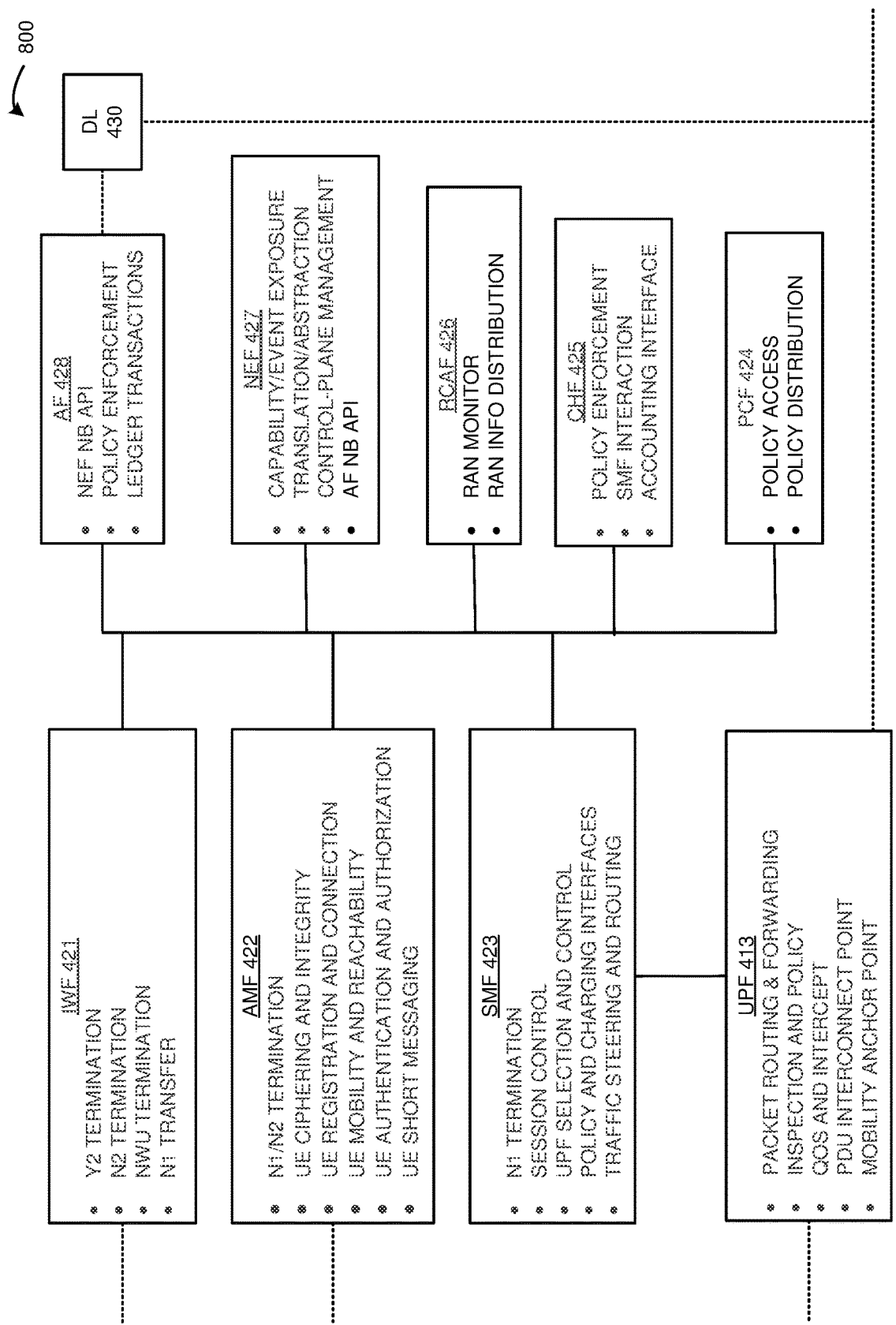
FIG. 9 further illustrates the wireless network core in the 5G wireless communication network.

FIG. 9 further illustrates wireless network core 800 in 5G wireless communication network 400. UPF 413 performs packet routing & forwarding, packet inspection and policy, QoS handling and lawful intercept, PDU interconnection, and mobility anchoring. IWF 421 performs Y2 termination, N2 termination, NWu termination, and N1 transfer. AMF 422 performs N1 termination, N2 termination, UE ciphering & integrity protection, UE registration and connection, UE mobility and reachability, UE authentication and authorization, and UE short messaging. SMF 423 performs N1 termination, session establishment/management, UPF selection and control, policy and charging control, and traffic steering and routing. PCF 424 performs UDR access for UE policies and distributes the UE policies based on network function. CHF 425 performs UE policy enforcement, SMF interaction, and accounting interaction. RCAF 426 performs RAN status monitoring and status reporting. NEF 427 performs capability and event exposure, data translation; abstraction, control-plane management, and NB API. AF 428 performs NEF access over the NB API, policy enforcement, and ledger transactions. DL node 430 performs dAPP execution, consensus, blockchain storage, and output transfer.

Figure 10:
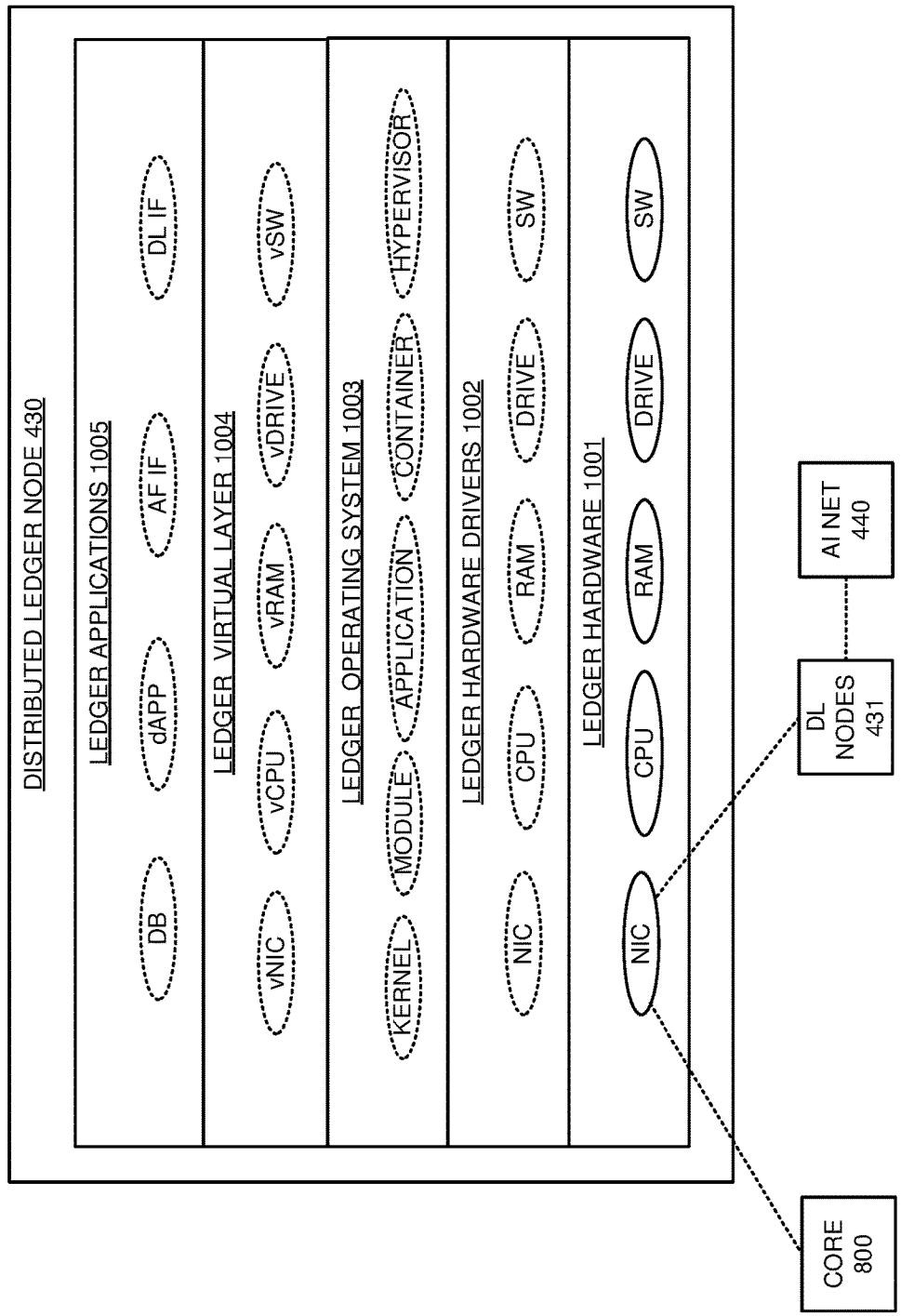
FIG. 10 illustrates a distributed ledger node in the 5G wireless communication network.

FIG. 10 illustrates DL node 430 in 5G wireless communication network 400. In this example, DL node 430 is external to AF 428 and wireless network core 800. DL nodes 130-131 and 431 could be similar to this example of DL node 430, although nodes 130-131 may differ. DL node 430 comprises ledger hardware 1001, ledger hardware drivers 1002, ledger operating system 1003, ledger virtual layer 1004, and ledger applications 1005. Ledger hardware 1001 comprises NICs, CPU, RAM, DRIVE, and SW. Ledger hardware drivers 1002 comprise software that is resident in the NIC, CPU, RAM, DRIVE, and SW. Ledger operating system 1003 comprise kernels, modules, applications, containers, hypervisors, and the like. Ledger virtual layer 1004 comprises vNIC, vCPU, vRAM, vDRIVE, and vSW. Ledger applications comprise blockchain database, dAPP, AF IF, and DL IF. Distributed ledger node 430 may be located at a single site or be distributed across multiple geographic locations. The NIC in ledger hardware 1001 are coupled to wireless network core 800 and DL nodes 431 over data links. Ledger hardware 1001 executes ledger hardware drivers 1002, ledger operating system 1003, ledger virtual layer 1004, and ledger applications 1005 to form and operate DL node 430. In some examples, DL node 430 is integrated within wireless network core 800 and possibly within AF 428.

The blockchain database stores data in the blockchain format. For the blockchain format, the distributed ledger executes the dAPP to execute ledger transactions that create data blocks. The data blocks are redundantly stored across multiple distributed ledger nodes. Each data block includes a hash of its previous data block to make the data store immutable. The dAPP supports user services like augmented reality, machine-control, wireless networking, and/or some other user product. The AF interface receives proposed ledger transactions from AF 428 and transfers ledger outputs to AF 428. The DL interface exchanges ledger transaction data with DL nodes 431 and receives network instructions from AI network 440 over DL nodes 431.

The wireless data network circuitry described above comprises computer hardware and software that form special-purpose network circuitry to serve UEs at future times based on a distributed ledger and artificial intelligence. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve UEs at future times based on a distributed ledger and artificial intelligence.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UE) responsive to an Artificial Intelligence (AI) network, the method comprising:
    the UE receiving a default bearer to a distributed ledger node from the wireless communication network;
    the UE receiving a wireless data service at geographic locations;
    the UE determining Quality-of-Service (QoS) levels for the wireless data service at the geographic locations and transferring the QoS levels for the wireless data service at the geographic locations to the distributed ledger node in a network core over the default bearer;
    the network core receiving the QoS levels for the wireless data service at the geographic locations from the UE and transferring the QoS levels for the wireless data service at the geographic locations for the UE to the AI network;
    the network core receiving a future QoS level, future geographic location, and future time for the wireless data service for the UE from the AI network;
    the network core signaling a network control-plane to deliver the wireless data service to the UE at the future geographic location and the future time using the future QoS level; and
    the UE receiving the wireless data service at the future geographic location and the future time using the future QoS level.

2. The method of claim 1 further comprising:
    the UE receiving an N1 signaling link from the wireless communication network; and wherein:
    the UE transferring the QoS levels for the wireless data service at the geographic locations to the distributed ledger node comprises transferring the QoS levels for the wireless data service at the geographic locations to the distributed ledger node over the N1 signaling link that traverses the default bearer.

3. The method of claim 1 wherein the network core comprises a Network Exposure Function (NEF).

4. The method of claim 1 wherein the network core comprises an Application Function (AF).

5. The method of claim 1 wherein the control plane comprises a Policy Control Function (PCF).

6. The method of claim 1 wherein the control plane comprises a Charging Function (CHF).

7. The method of claim 1 wherein the control plane comprises an Access and Mobility Management Function (AMF).

8. The method of claim 1 wherein the control plane comprises a Session Management Function (SMF).

9. A wireless communication network to serve User Equipment (UE) responsive to an Artificial Intelligence (AI) network, the wireless communication network comprising:
the UE configured to receive a default bearer to a distributed ledger node from the wireless communication network;
the UE configured to receive a wireless data service at geographic locations;
the UE configured to determine Quality-of-Service (QoS) levels for the wireless data service at the geographic locations and transfer the QoS levels for the wireless data service at the geographic locations to the distributed ledger node in a network core over the default bearer;
the network core configured to receive the QoS levels for the wireless data service at the geographic locations from the UE and transfer the QoS levels for the wireless data service at the geographic locations for the UE to the AI network;
the network core configured to receive a future QoS level, future geographic location, and future time for the wireless data service for the UE from the AI network;
the network core configured to signal a network control-plane to deliver the wireless data service to the UE at the future geographic location and the future time using the future QoS level; and
the UE configured to receive the wireless data service at the future geographic location and the future time using the future QoS level.

10. The wireless communication network of claim 9 further comprising:
the UE configured to receive an N1 signaling link from the wireless communication network; and wherein:
the UE is configured to transfer the QoS levels for the wireless data service at the geographic locations to the distributed ledger node over the N1 signaling link that traverses the default bearer to transfer the QoS levels for the wireless data service at the geographic locations to the distributed ledger node.

11. The wireless communication network of claim 9 wherein the network core comprises a Network Exposure Function (NEF).

12. The wireless communication network of claim 9 wherein the network core comprises an Application Function (AF).

13. The wireless communication network of claim 9 wherein the control plane comprises a Policy Control Function (PCF).

14. The wireless communication network of claim 9 wherein the control plane comprises a Charging Function (CHF).

15. The wireless communication network of claim 9 wherein the control plane comprises an Access and Mobility Management Function (AMF).

16. The wireless communication network of claim 9 wherein the control plane comprises a Session Management Function (SMF).

17. A wireless communication network to serve User Equipment (UE) responsive to an Artificial Intelligence (AI) network, the wireless communication network comprising:
the UE configured to receive a default bearer to a distributed ledger node from the wireless communication network;
the UE configured to receive a wireless data service at geographic locations;
the UE configured to determine Quality-of-Service (QoS) levels for the wireless data service at the geographic locations and transfer the QoS levels for the wireless data service at the geographic locations to the distributed ledger node over the default bearer;
the distributed ledger node configured to receive the QoS levels for the wireless data service at the geographic locations from the UE and transfer the QoS levels for the wireless data service at the geographic locations to the AI network;
the distributed ledger node configured to receive a future QoS level, future geographic location, and future time for the wireless data service for the UE from the AI network and transfer the future QoS level, future geographic location, and future time to a Network Exposure Function (NEF);
the NEF configured to expose the future QoS level, future geographic location, and future time to a control plane function;
the control plane function configured to direct a User Plane Function (UPF) to deliver the wireless data service to the UE at the future geographic location and the future time using the future QoS level; and
the UE configured to receive the wireless data service at the future geographic location and the future time using the future QoS level.

18. The wireless communication network of claim 17 wherein the distributed ledger node is configured to transfer the future QoS level, future geographic location, and future time to the NEF over an Application Function (AF).

19. The wireless communication network of claim 17 wherein the control plane function comprises an Access and Mobility Management Function (AMF).

20. The wireless communication network of claim 17 wherein the control plane function comprises a Session Management Function (SMF).

* * * * *